United States Patent
Goossen (10) Patent No.: US 8,251,307 B2
(45) Date of Patent: Aug. 28, 2012

(54) AIRBORNE MANIPULATOR SYSTEM

(75) Inventor: Emray R. Goossen, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1105 days.

(21) Appl. No.: 12/104,432

(22) Filed: Apr. 16, 2008

(65) Prior Publication Data

US 2009/0050750 A1 Feb. 26, 2009

Related U.S. Application Data

(60) Provisional application No. 60/943,228, filed on Jun. 11, 2007.

(51) Int. Cl.
 *B64C 29/00* (2006.01)
 *B64C 13/18* (2006.01)
(52) U.S. Cl. .................. 244/23 C; 244/76 R
(58) Field of Classification Search .......... 901/30–33, 901/36; 244/23 C, 12.2, 17.11, 6
 See application file for complete search history.

(56) References Cited

U.S. PATENT DOCUMENTS

| | | | |
|---|---|---|---|
| 3,972,555 A | 8/1976 | Tryon | 294/106 |
| 4,018,409 A | 4/1977 | Burch | 244/161 |
| 4,545,723 A * | 10/1985 | Clark | 414/730 |
| 4,549,846 A * | 10/1985 | Torii et al. | 414/729 |
| 4,579,480 A | 4/1986 | Szabo | 405/169 |
| 4,698,775 A * | 10/1987 | Koch et al. | 700/218 |
| 4,897,014 A * | 1/1990 | Tietze | 414/729 |
| 5,150,857 A | 9/1992 | Moffitt et al. | |
| 5,152,478 A | 10/1992 | Cycon et al. | |
| 5,295,643 A | 3/1994 | Ebbert et al. | |
| 5,382,885 A * | 1/1995 | Salcudean et al. | 318/568.11 |
| 5,419,513 A * | 5/1995 | Flemming et al. | 244/12.2 |
| 5,575,438 A | 11/1996 | McGonigle et al. | |
| 5,695,153 A | 12/1997 | Britton et al. | |
| 5,890,441 A | 4/1999 | Swinson | 244/12.3 |
| 6,450,445 B1 * | 9/2002 | Moller | 244/23 A |
| 6,457,761 B1 | 10/2002 | Benoit | 294/86.41 |
| 6,464,166 B1 | 10/2002 | Yoeli | 244/12.1 |
| 6,588,701 B2 * | 7/2003 | Yavnai | 244/23 A |
| 6,604,706 B1 | 8/2003 | Bostan | 244/6 |
| 6,691,949 B2 | 2/2004 | Plump et al. | |
| 6,721,646 B2 | 4/2004 | Carroll | |
| 7,032,861 B2 | 4/2006 | Sanders, Jr. et al. | |

(Continued)

FOREIGN PATENT DOCUMENTS

DE 3244211 A1 5/1984

(Continued)

OTHER PUBLICATIONS

U.S. Appl. No. 60/943,228, filed Jun. 11, 2007, Goossen.

(Continued)

*Primary Examiner* — Tien Dinh
(74) *Attorney, Agent, or Firm* — Shumaker & Sieffert, P.A.

(57) ABSTRACT

A manipulator arm system on a ducted air-fan UAV is disclosed herein. The target site may be accurately located by the UAV, and the manipulator system may accurately locate the payload at the target site. The manipulator arm may select tools from a toolbox located on-board the UAV to assist in payload placement or the execution of remote operations. The system may handle the delivery of mission payloads, environmental sampling, and sensor placement and repair.

15 Claims, 12 Drawing Sheets

U.S. PATENT DOCUMENTS

| | | |
|---|---|---|
| 7,044,422 B2 | 5/2006 | Bostan |
| 7,249,732 B2 | 7/2007 | Sanders, Jr. et al. |
| 2004/0094662 A1 | 5/2004 | Sanders, Jr. et al. |
| 2004/0129828 A1 | 7/2004 | Bostan |
| 2005/0082421 A1 | 4/2005 | Perlo et al. |
| 2006/0049304 A1* | 3/2006 | Sanders et al. ............... 244/23 A |
| 2006/0192047 A1 | 8/2006 | Goossen |
| 2006/0231675 A1 | 10/2006 | Bostan |
| 2007/0034738 A1 | 2/2007 | Sanders |
| 2007/0034739 A1 | 2/2007 | Yoeli |
| 2007/0051848 A1* | 3/2007 | Mantych et al. .......... 244/100 R |
| 2007/0193650 A1 | 8/2007 | Eannati |
| 2007/0221790 A1 | 9/2007 | Goossen |
| 2007/0228214 A1 | 10/2007 | Horak |
| 2007/0244608 A1 | 10/2007 | Rath et al. |
| 2007/0246601 A1 | 10/2007 | Layton |
| 2007/0262195 A1 | 11/2007 | Bulaga et al. |
| 2007/0295298 A1 | 12/2007 | Mark |

FOREIGN PATENT DOCUMENTS

| | | |
|---|---|---|
| EP | 1767453 | 6/2008 |
| WO | 0015497 | 3/2000 |
| WO | 2004002821 | 1/2004 |
| WO | 20080147484 A2 | 12/2008 |

OTHER PUBLICATIONS

U.S. Appl. No. 60/983,551, filed Oct. 29, 2007, Goossen.

U.S. Appl. No. 11/947,585, filed Nov. 29, 2007, Colclough.

Reply to communication from the Examining Division, for EP Application No. 08157886.6, dated Aug. 26, 2011, 10 pages.

European Search Report from corresponding EP Application No. 08157886.6, mailed Apr. 12, 2011, 3 pages.

Examination Report from corresponding EP Application No. 08157886.6, mailed May 2, 2011, 5 pages.

* cited by examiner

AIRBORNE MANIPULATOR SYSTEM

RELATED APPLICATIONS

The present patent application claims priority under 35 U.S.C. §119(e) to U.S. Provisional Patent Application Ser. No. 60/943,228, filed Jun. 11, 2007. The full disclosure of U.S. Provisional Patent Application Ser. No. 60/943,228 is incorporated herein by reference.

FIELD

The present invention relates generally to manipulator arms for accomplishing work in environments in which it may be undesirable to have a human operator perform work. More specifically, the invention relates to manipulator arms used with ducted fan air-vehicles as a means of enabling the use of the manipulator arms in airborne and perched manipulation operations.

BACKGROUND

Frequently it is necessary to perform operations in locations that may be difficult or dangerous for a human being to access. For instance, the location may be dangerous for a human being because of an environmental contaminant, because of the presence of hostile parties or weapons controlled by hostile parties, or because the location is such that a human may undergo at a high risk of injury or death to access the location. Further, the locations may be difficult to access, and enabling a human to access the location may require a large amount of time, labor, and costly equipment.

Some operations, including installing, maintaining, and repairing sensors, may currently be performed by humans. When the operation must be performed in a dangerous environment, the human is put at risk of harm. Also, it may be desirable to perform operations remotely with a device, which may be preprogrammed to autonomously perform an operation, or may be controlled by a human operator.

An alternative to using a human to perform some operations is to use an air drop. In an air drop, a component, such as a sensor, may be dropped from an elevation or deployed using a ballistic delivery system. These systems are limited in accuracy. Guidance systems for the ballistic delivery systems may be expensive and may still have large inaccuracies in the placement of the component. Additionally, it may be impossible to place the components accurately on a vertical surface, as the components may simply land on a surface, and gravity may cause the component to slide on a surface that is not perfectly horizontal. Finally, it may be impossible to retrieve or repair the component after it has been deployed.

Manipulator arms are used with ground-based robotic systems to examine threats to personal injury, investigate the presence of environmental contaminants, collect samples of materials, and to disarm explosive devices. These ground-based robotic systems may have difficulty reaching areas in rugged terrain, or it may take a long time to reach the desired location. Additionally, the ground-based robotic systems are only capable of reaching locations on the ground or close to the ground.

Therefore, there is a need for an improved method of performing operations in environments which are difficult or dangerous for a human being to access.

SUMMARY

The present disclosure combines a manipulator arm with a ducted fan air-vehicle. Ducted fan air-vehicles are known for their superior stationary aerodynamic hovering performance, three-dimensional precision position hold, low speed flights, precision vertical take-off and landing ("VTOL") and safe close-range operations. Ducted fan air-vehicles may be pre-programmed to perform operations autonomously, or they may be controlled by a human operator. Therefore, ducted fan air-vehicles may be unmanned aerial vehicles.

Unmanned aerial vehicles may be capable of travelling into unfamiliar, rugged, or hostile territory without placing a human in danger. A system comprising a unmanned ducted-fan air vehicle ("UAV") having a manipulator arm may enable the accurate location of a target site, and the performance of an operation at the target site. The UAV system may also allow the emplacement of components on vertical surfaces. Additionally, the UAV system would allow rapid deployment of the system to the target site.

The manipulator arm may be integrated onto the UAV system in a variety of ways. The manipulator arm may be many sizes and shapes, and may have a variety of different attachments. For instance, the manipulator arm could be attached to the vehicle via a hinge, or on a track to allow a greater range of movement. The manipulator arm may have any number of sections connected together, and may be connected in a variety of ways. The manipulator arm may also have an extender portion operable, for example, by a screw jack connection, to allow extended reach of the manipulator arm.

The UAV system may also comprise a toolset having multiple tools for use by the manipulator arm during operations. The toolset may be located onboard the UAV system, and may comprise a variety of tools. The tools in the toolset may be interchangeable on the manipulator arm. There may be an on-board toolbox containing a variety of tools to be selected during an operation. The manipulator arm may be able to select tools as needed from this toolbox to perform a series of operations. An on-board payload container may contain items to be emplaced, attached, or replaced in operations that may include repair, emplacement, recovery, and/or defusing.

The system may also have a sensor for obtaining image data of the surroundings. The sensor may be affixed to a surface of the UAV. The sensor may be used to obtain data, and may also be used to assist in guidance of the UAV system. The UAV system may have sensors that provide information regarding contact pressure between the manipulator arm and a surface or object, torque caused by the interaction of the manipulator arm and an object or surface, and the position and environment of the UAV system. The information provided by these sensors may aid in performing manipulator arm operations.

The UAV system may have an onboard camera or cameras capable of monitoring a 360° field of vision around the UAV system. This may provide a high level of awareness of the situational environment and, therefore, increased security for the equipment and increased likelihood of a successful operation.

The UAV system may also have center of gravity ("CG") and torque-balancing compensation. The UAV system may undergo some forces which may affect the stability of the UAV system. These forces may be caused by wind, collisions, or by the operation of the manipulator arm and mandible. These forces may be at least partially compensated for by using the CG and torque-balancing compensation system of the UAV system.

Other objects, advantages and novel features, and further scope of applicability of the present disclosure will be set forth in the detailed description to follow, taken in conjunction with the accompanying drawings, and in part will become apparent to those skilled in the art upon examination of the following, or may be learned by practice of the disclosure. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Using a UAV with a manipulator arm may allow operations to be performed without a human in the immediate environment. Some operations that may be necessary to perform in hazardous environments include testing environmental conditions such as contaminant or pollutant levels, temperature, presence of biohazards, or radioactivity levels. A UAV with a manipulator arm may be used to emplace sensors. These sensors could provide data relating to environmental conditions or reconnaissance. The operation may require deposing munitions or an explosive device. The operation may also require maintenance or installation of a component that requires a complex delivery. The component may have to be attached to a vertical surface, and may also need to be fixed by screws or another connector. Providing a manipulator arm on an unmanned aerial vehicle may allow the performance of a variety of operations in environments in which it is dangerous or difficult for humans to reach.

Figure 1:
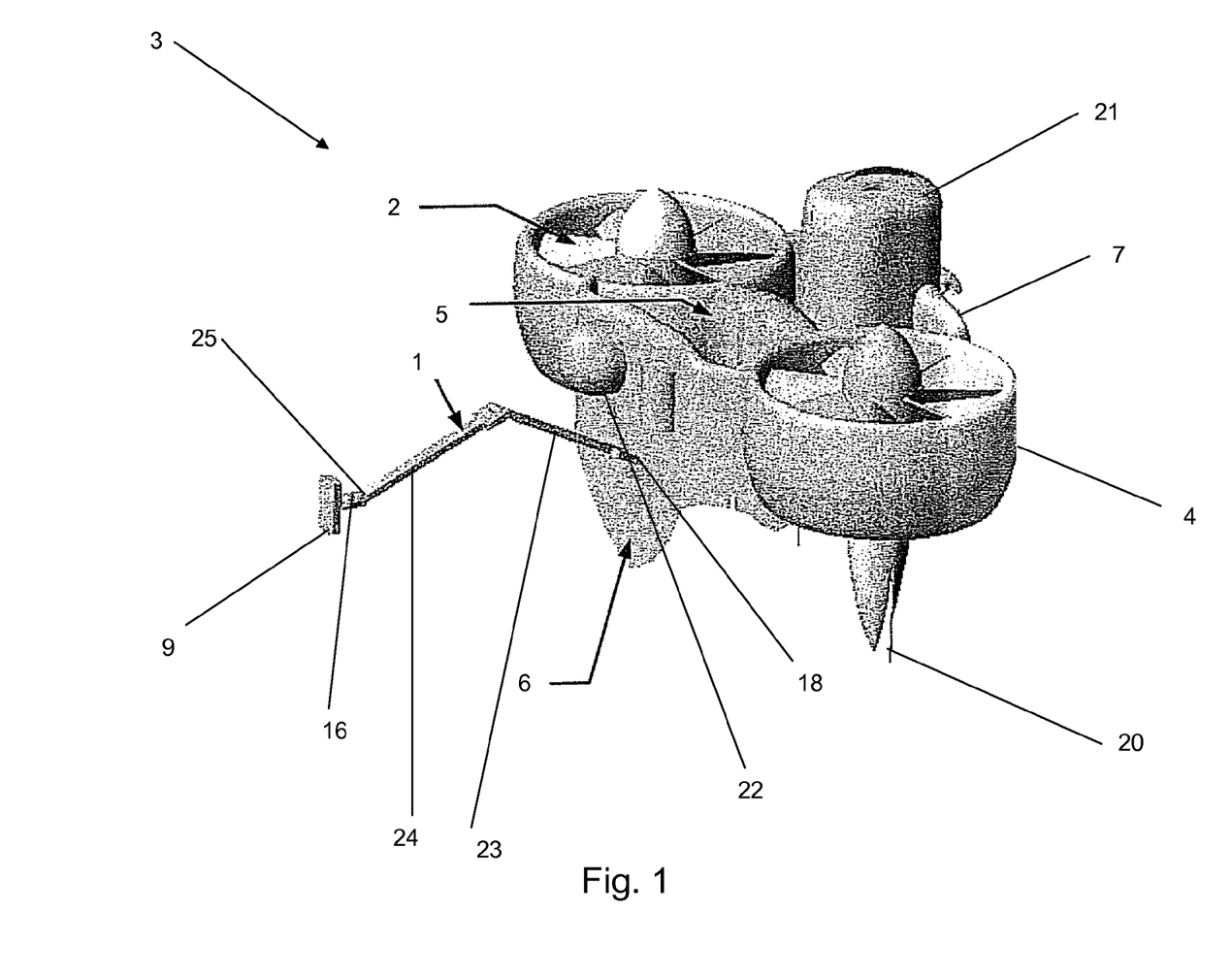
FIG. 1 is a pictorial representation of a ducted fan UAV including a manipulator arm, according to an example.

FIG. 1 is a pictorial representation of a ducted fan unmanned aerial vehicle 3 ("UAV") including a manipulator arm 1. The UAV 3 includes a duct 4 surrounding a fan 2. The duct 4 helps to direct the airflow of the fan 2 and protects the fan 2 from foreign objects coming into contact with the blades of the fan 2. The UAV 3 is shown in FIG. 1 with two fans 2 surrounded by ducts 4. However, the UAV 3 may have any number of fans 2.

In hover flight, the fans 2 direct air downward in the direction of the support legs 20. In forward flight, the fans 2 direct air at least partially in a horizontal direction, and the UAV 3 may accomplish translational movement in a horizontal direction.

The UAV 3 may have an upper biplane airfoil 7 and a lower biplane airfoil 6. The upper and lower ducted biplane airfoils 6, 7 may connect the ducts 4 surrounding the fans 2, may act as a shell to protect any avionics contained within the UAV 3, and may act as an airfoil to provide lift for the UAV 3 when the UAV 3 is in forward flight. Additionally, the UAV 3 may have support legs 20 to support the UAV 3 when the UAV 3 is located on a horizontal surface. The support legs 20 may have feet at the base of the support legs 20 to prevent the UAV 3 from moving when the UAV 3 is supported by the support legs 20. If the motion of the fans 2 of the UAV 3 is reversed in direction, the fans 2 may direct air in a direction opposite the support legs 20, and the support legs 20 may act as a support and a stabilization mechanism for the UAV 3 when the UAV 3 is located on a vertical or a horizontal surface. It may be advantageous to stabilize the UAV 3 on a surface when the manipulator arm 1 is performs an operation that produces a counterforce on the UAV 3.

The UAV 3 may have a power supply 21 to supply power to the motors of the fans 2. The power supply 21 may be an engine powered by gasoline or an alternative combustible fuel, an electric motor powered by batteries located on the UAV 3, an electric motor powered by a tether connecting the UAV 3 to the power supply, or by any other method of powering fans 2 known in the art. Having a UAV 3 tethered to the power supply may have advantages in that there may be an unlimited supply of energy to the UAV 3 and, thus, flight time may be essentially unlimited, the weight of the UAV 3 may be reduced because the UAV 3 may not have to carry an engine an batteries or fuel, and secure data communications may be transmitted through the tether to and from a receiver on the opposite end of the tether. However, the tether may restrict mobility of the UAV 3. Therefore, in some applications it may be desirable to have an untethered UAV 3 having a wider range of motion.

The UAV 3 may also have a payload stores pod 5. The payload stores pod 5 is shown in FIG. 1 located between two fans 2 and between the upper and lower biplane airfoils 6, 7. However, the payload stores pod 5 may be located anywhere on the UAV 3 that is accessible by the manipulator arm 1. The payload stores pod 5 may contain payload. The payload may be sensors, cameras, containers for obtaining environmental samples, transmitters, repair tools, replacement parts, or any other type of payload that may need to be delivered by a UAV 3. The payload stores pod 5 may have a lid for protecting and containing the contents of the payload stores pod 5. The lid may be opened or closed by the manipulator arm 1 to access the contents, or the lid may have a control the opens or closes the payload stores pod 5 upon receipt of a command. Additionally, the payload stores pod 5 may contain a toolkit for use with the manipulator arm 1. Alternatively, the toolkit may be located outside the payload stores pod 5 and may be located anywhere on the UAV 3 that is accessible by the manipulator arm 1. The payload stores pod may be aerodynamically shaped for minimized drag in cruise.

The UAV 3 may have a sensor 22 located on a surface of the UAV 3. In FIG. 1, the sensor 22 is shown located on the lower biplane airfoil 6; however, the sensor 22 may be located on any surface of the UAV 3. The sensor 22 may be any shape and size. The sensor 22 may transmit image data to a human for use by the human in controlling the UAV. The sensor 22 may also collect or transmit image data for use in reconnaissance operations or for general terrain mapping. The sensor 22 may be a standard digital image camera, or it may be another type of apparatus for obtaining information, such as a night vision camera, a heat sensor, an x-ray imager, a radio signal detector, or any other type of device known in the art for obtaining information about surroundings.

Alternatively, the sensor 22 may be located on the manipulator arm 1. The sensor 22 may be movable to obtain data from the surroundings in multiple directions. The sensor 22 may be moved by an operator or by a preprogrammed sequence to obtain information about the surroundings. The information obtained by the sensor 22 may assist the operator or to the preprogrammed sequence to complete an operation. Further, the sensor 22 may be stored in the payload stores pod, discussed further with respect to FIG. 3.

The UAV 3 may be controlled by a human in a different location from the UAV 3. The human may receive information about the surroundings based on the sensor 22 located on the UAV 3. Alternatively, if the UAV 3 is in visible range of the human, the human may receive information about the surroundings of the UAV 3 by visually observing the UAV 3. The human may control the location and operation of the UAV and the manipulator arm 1 by sending commands to the avionics located on the UAV 3. Alternatively, the UAV 3 may perform operations in autonomous mode, in which the actions of the UAV 3 are controlled by a preprogrammed sequence. The preprogrammed sequence may be stored in a data storage module with a controller of the avionics on the UAV 3, or the preprogrammed module may create commands that may be transmitted to the avionics on the UAV 3.

The avionics may provide control of the flight altitude, speed, orientation, and translational movement. By controlling these aspects of the movement of the UAV 3, the UAV 3 may be precisely positioned on or close to a target site. The UAV 3 may be positioned on or close to a target site such that the manipulator arm 1 is capable of reaching the target and performing an operation on the target site. Although not shown in FIG. 1, avionics modules for control of a UAV 3 are known in the art.

The manipulator arm 1 may have any number of moveable portions. In FIG. 1, the manipulator arm is shown having pivot 18, first portion 23, second portion 24, and third portion 25. However, the manipulator arm 1 may have any number of portions. The first portion 23 may be hinged, or otherwise moveably connected, to the second portion 24. The first portion 23 may be hinged, or otherwise moveably connected, to the pivot 18. The pivot 18 may be affixed to the UAV 3. Alternatively, the pivot may be movably attached to the UAV 3. In one embodiment, the pivot 18 may be connected to a track located on the UAV 3 to allow the manipulator arm 1 to move along the direction of the track. The second portion 24 may be hinged, or otherwise moveably connected, to a third portion 25.

The third portion 25 may be capable of receiving a tool. As an example, the manipulator arm 1 of FIG. 1 is shown having a chuck tool 16 attached to the third portion 25. The chuck tool 16 may be connected to an additional tool. The chuck tool 16 may be connected to the third portion 25 so as to allow rotational movement of the chuck tool 16 around its cylindrical axis. The chuck tool 16 may be capable of connecting to a plurality of additional tools.

Each of the connections between portions of the manipulator arm 1 may be controllably moved by sending commands to a controller of the manipulator arm 1. The controller may be integrated into the avionics module, or may be a separate controller. The manipulator joints may be driven by servos located at the hinge point, a cable system, pneumatic, or hydraulic pressure. Methods of controlling connections of a manipulator arm 1 are known in the art and not illustrated in FIG. 1.

Figure 2:
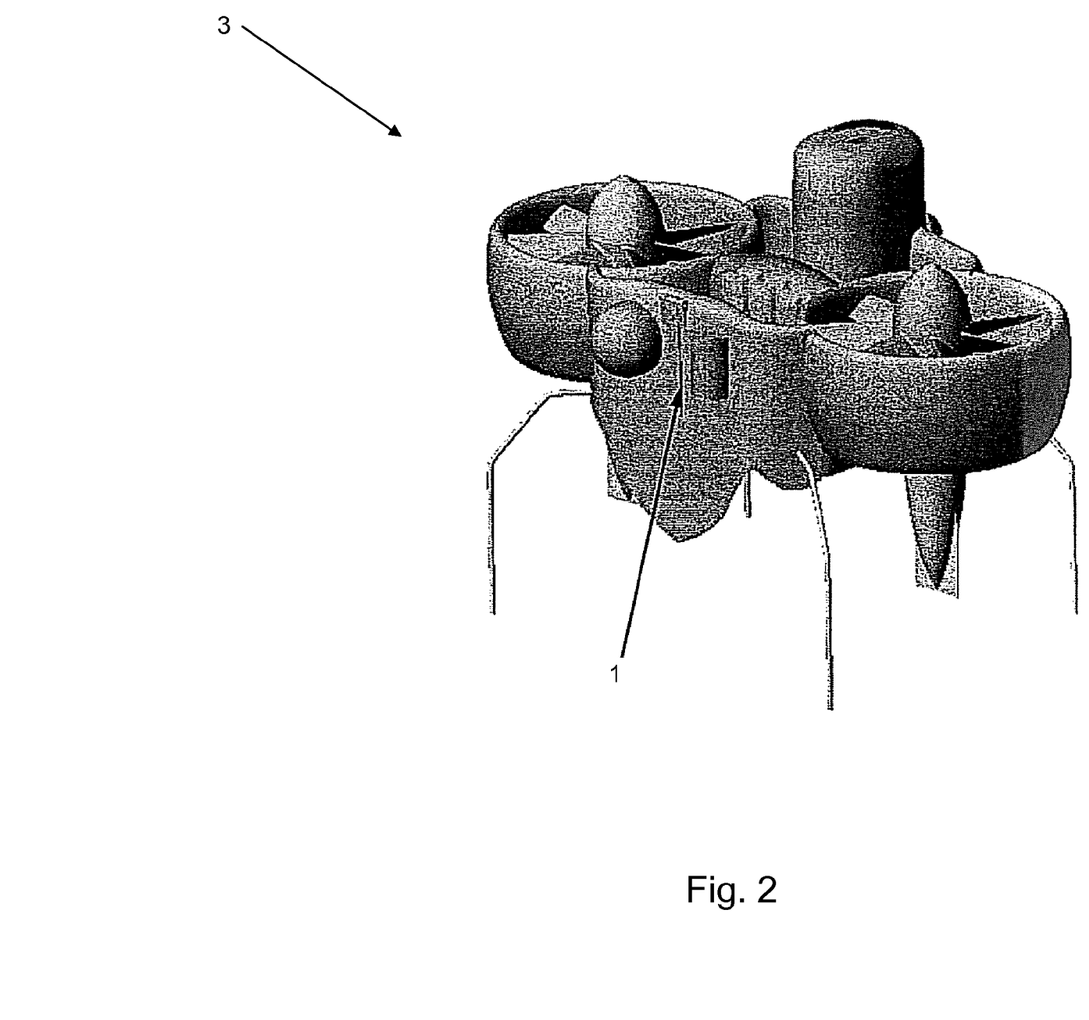
FIG. 2 is a pictorial representation of a ducted fan UAV including a manipulator arm in the stowed position.

Referring to FIG. 2, the UAV 3 is shown having the manipulator arm 1 in the stowed position. The manipulator arm 1 may be able to be positioned so that the manipulator arm 1 lies relatively flat along a surface of the UAV 3. This may be beneficial for times when the manipulator arm 1 is not in use, both to protect the manipulator arm 1 from possible damage, and to prevent interference with the aerodynamics of the UAV 3.

Figure 3:
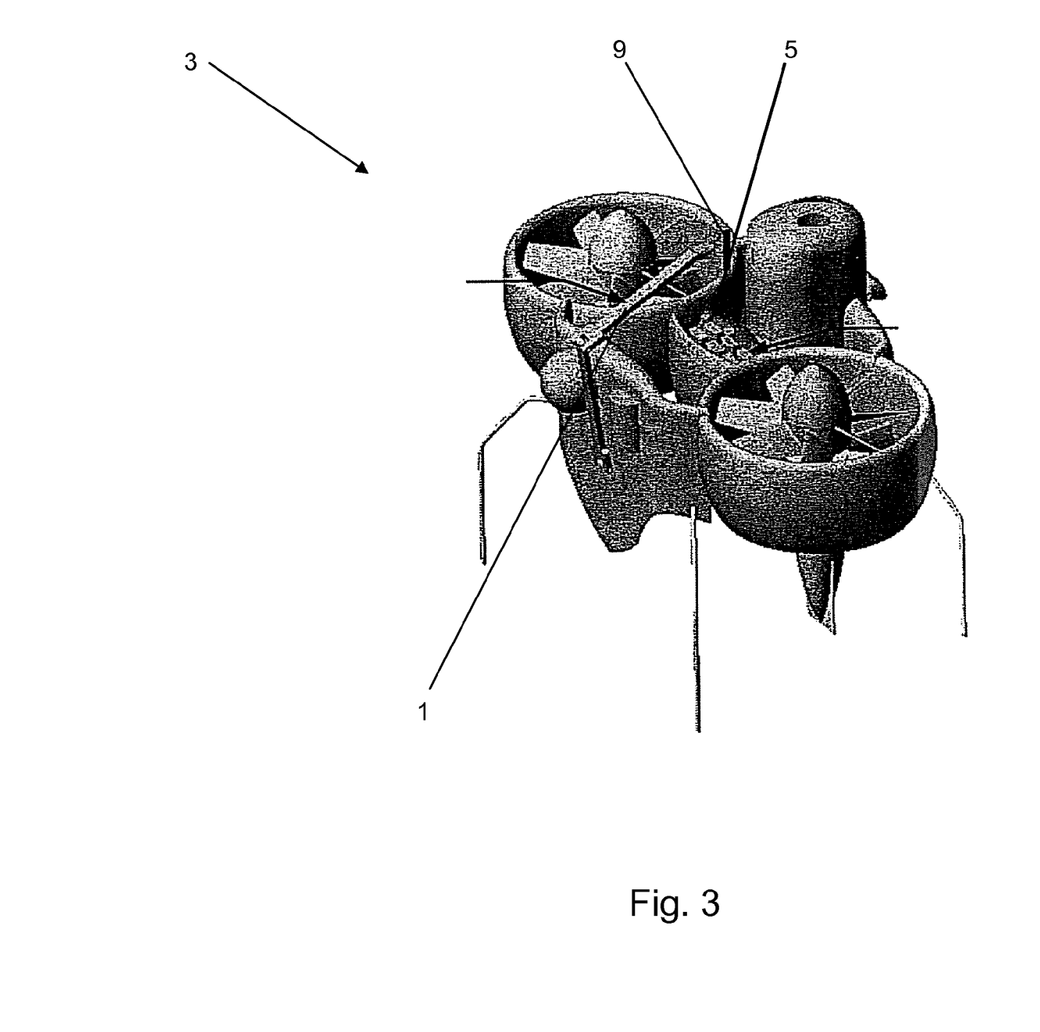
FIG. 3 is a pictorial representation of a ducted fan UAV including a manipulator arm holding a payload in the process of either extracting or storing a payload in the payload stores pod, according to an example.

Referring to FIG. 3, the manipulator arm 1 is shown with the chuck tool 16 located over the payload stores pod 5 and holding a payload 9. The manipulator arm 1 may be capable of motion such that the manipulator arm 1 can retrieve or place payload 9 within the payload stores pod 5.

Figure 4:
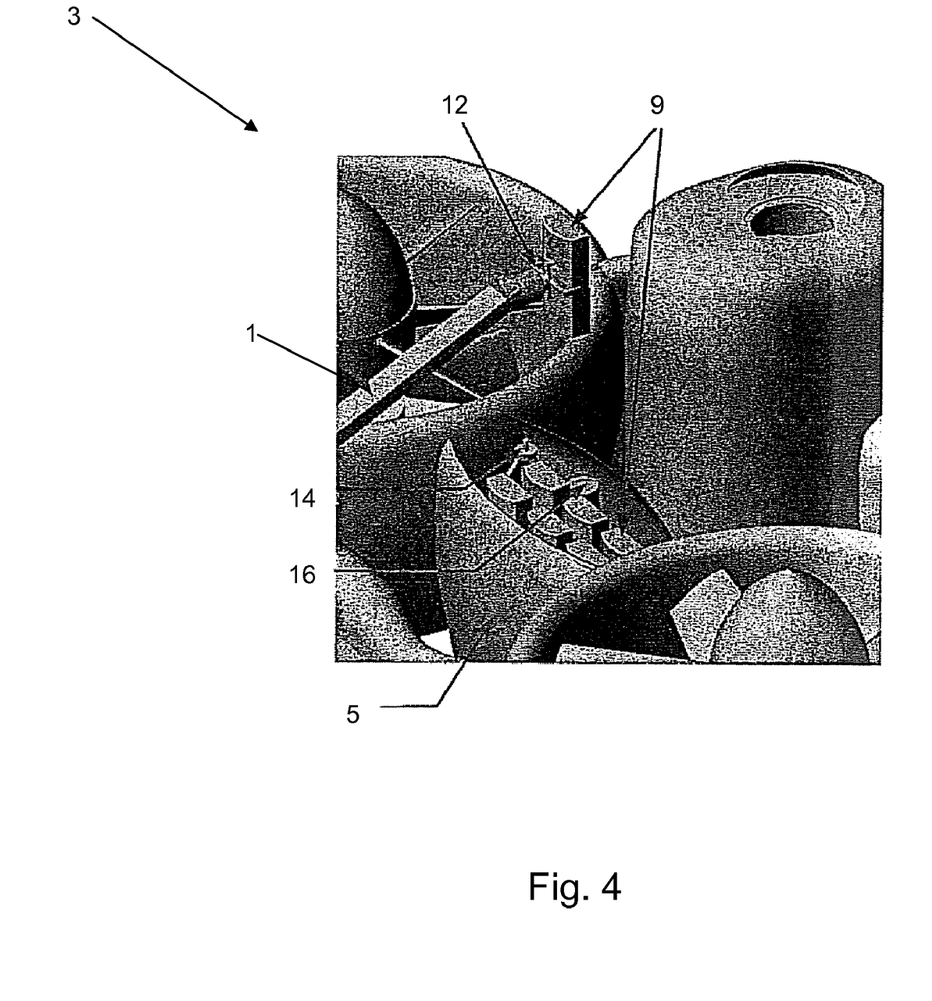
FIG. 4 is a pictorial view of a payload stores pod located on a ducted fan UAV, according to an example.

Referring to FIG. 4, a payload stores pod is shown 5 in detail. In one embodiment, the payload stores pod 5 may contain payload 9 and tools for use with the manipulator arm 1. Tools which may be useful in operations using a manipulator arm 1 are a bulb tool 14, a mandible 12, and the chuck tool 16, among others. The tools may also comprise a spray nozzle. The spray nozzle may have a hose for transporting fluids, connected to a tank located on the UAV 3. The tools may also comprise a welding tool. The welding tool may have a hose for transporting the soldering liquid, connected to a tank located on the UAV 3. The tools may also comprise cutting tools which may be rotary cutting blades, knife blades, end or side cutters, among others. The cutting tools may be used to diffuse explosive devices by cutting wires and may be used to open objects for internal access. The tools may be stored in the payload stores pod 5. Alternatively, they may be stored in another location on the UAV 3.

Figure 5:
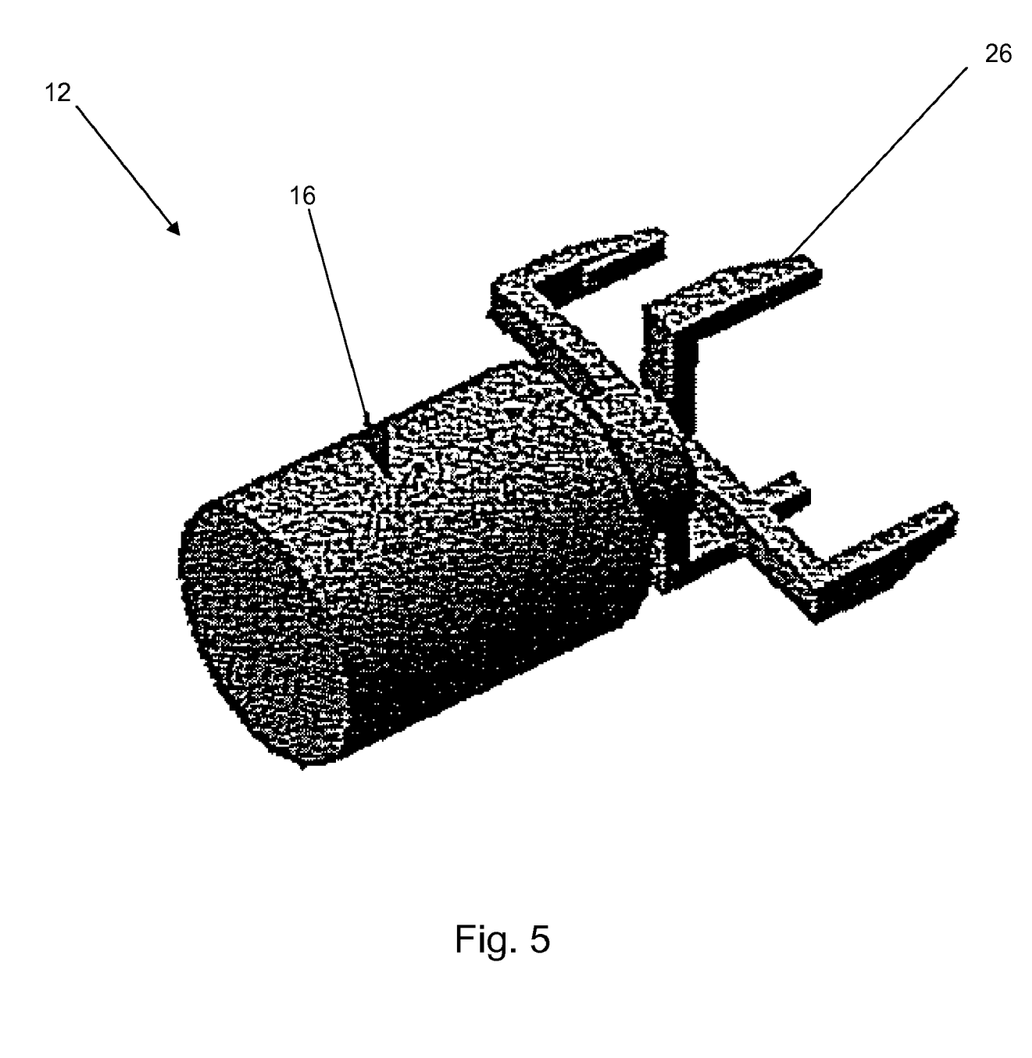
FIG. 5 is a pictorial view of a manipulator chuck tool and a mandible tool, according to an example.

Referring to FIG. 5, the mandible tool 12 is shown connected to the chuck tool 16. The mandible tool 12 may have a plurality of bent spines 26 that may be extended and contracted so as to grasp an object. The mandible tool 12 is shown in FIG. 5 as having four bent spines 26; however, the mandible tool 12 may have any number of bent spines.

Figure 6:
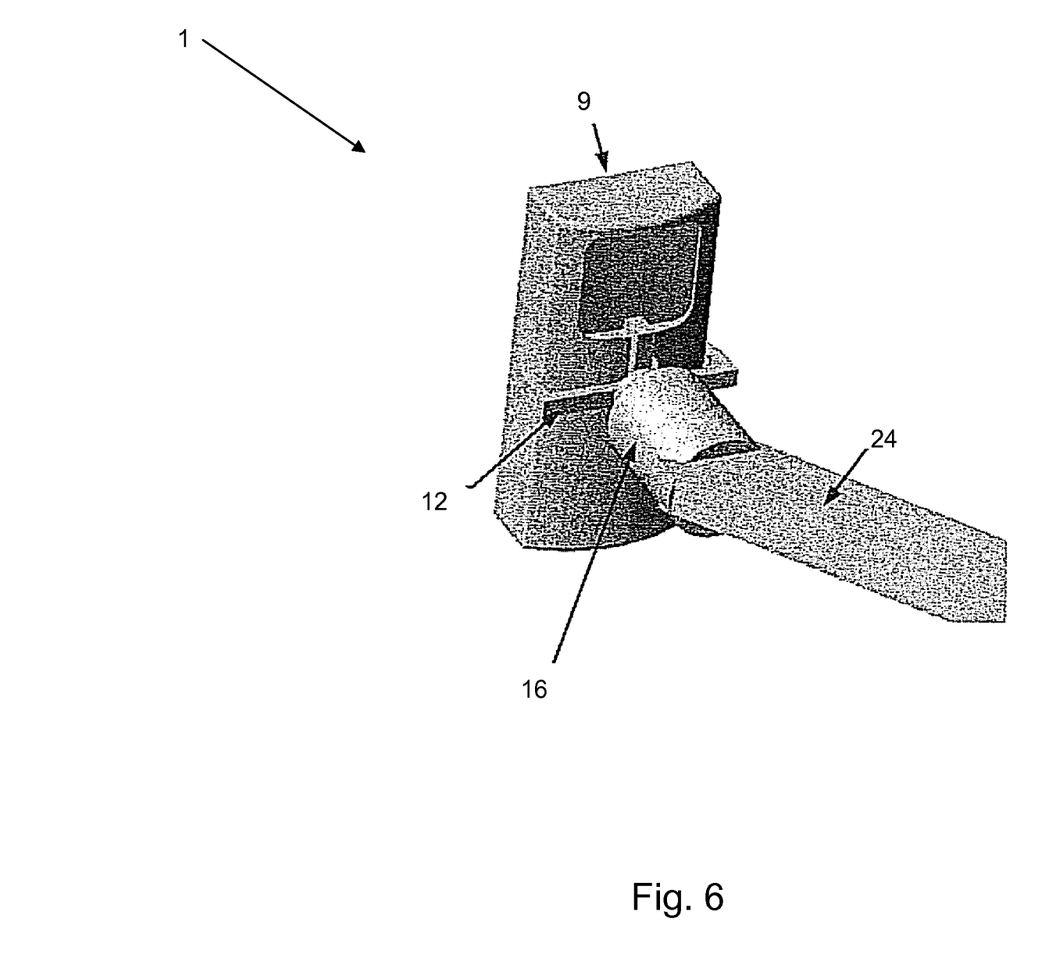
FIG. 6 is a pictorial view of a manipulator arm having a mandible tool holding a payload, according to an example.

Referring to FIG. 6, the manipulator arm 1 is shown holding a payload 9. The chuck tool 16 may be connected to the third portion 25 of the manipulator arm 1. The mandible tool 12 may be connected to the chuck tool 16. The bent spines 26 may be extended and contracted so as to grasp an object. In FIG. 5, the mandible tool 12 is shown grasping a payload 9.

Figure 7:
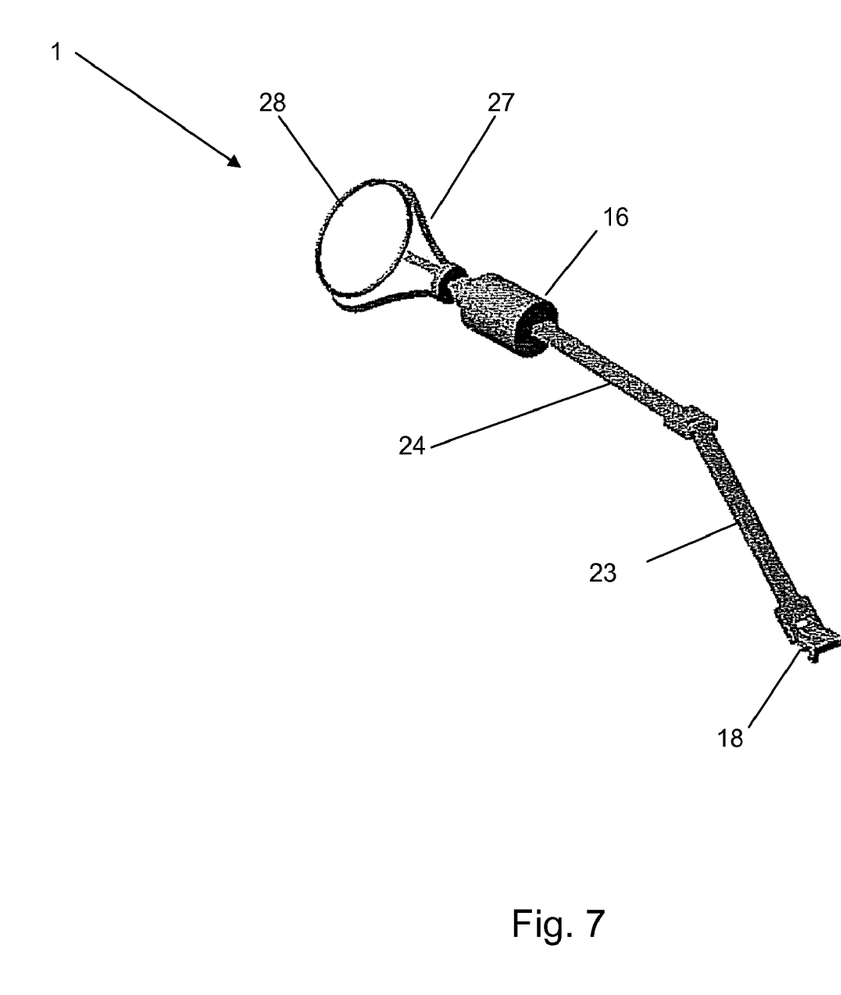
FIG. 7 is a pictorial view of a manipulator arm having a manipulator chuck tool and a bulb tool, according to an example.

Referring to FIG. 7, the bulb tool 14 is shown attached to the chuck tool 16. The bulb tool 14 may have a plurality of spines 27 attached at one end to a flexible member 28 for grasping bulbs and other rounded objects. The spines 27 may be extended or contracted to control the shape of the flexible member 28 and the amount of grasping force exerted on the grasped object. Rotation may be provided by the chuck tool.

Figure 8:
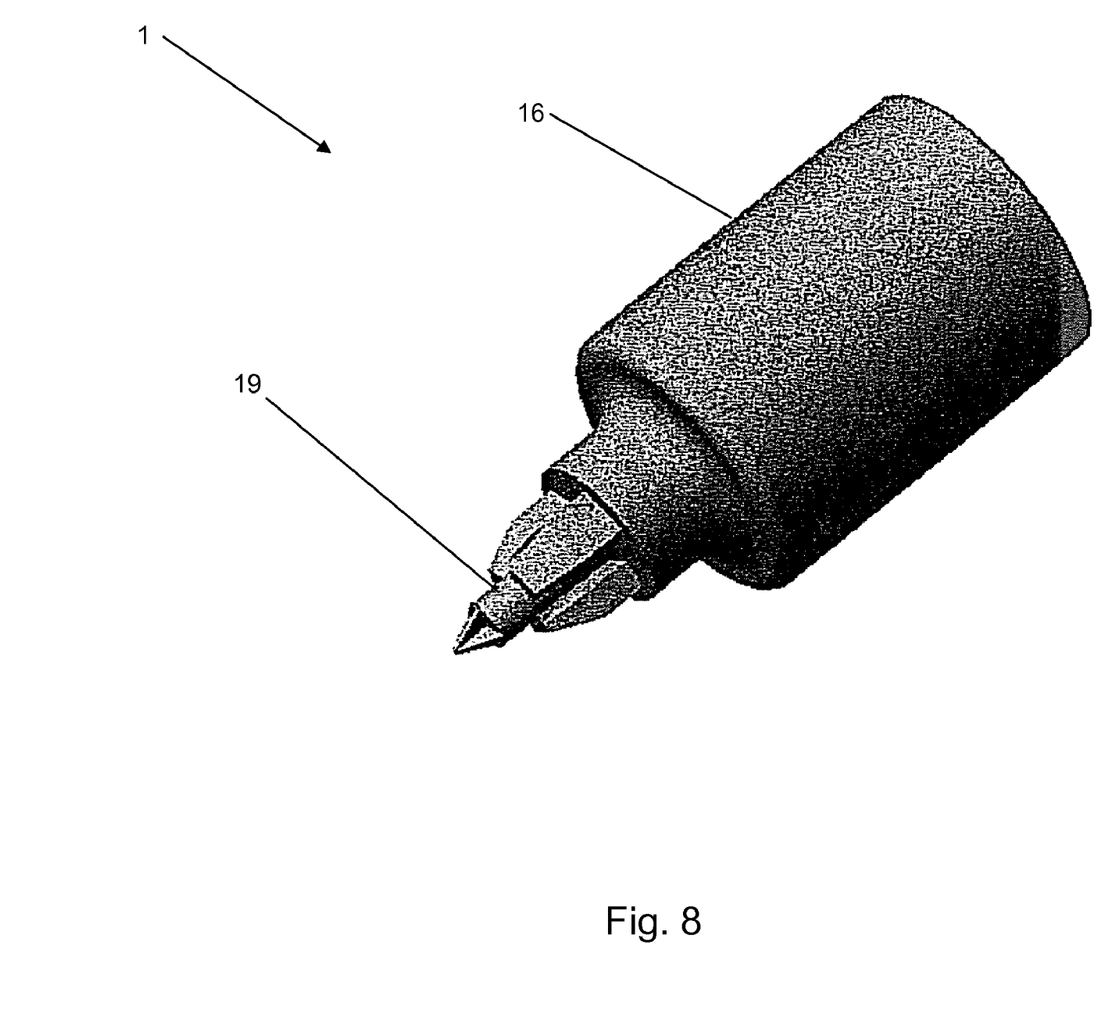
FIG. 8 is a pictorial view of a manipulator chuck tool and a Phillips head screwdriver tool, according to an example.

Referring to FIG. 8, a Phillips head screwdriver bit 19 is shown connected to the chuck tool 16. The chuck tool 16 may be connected to any number of devices that may be used with a drill tool. For example, screwdriver bits and drill bits may also be used with the chuck tool 16.

Figure 9:
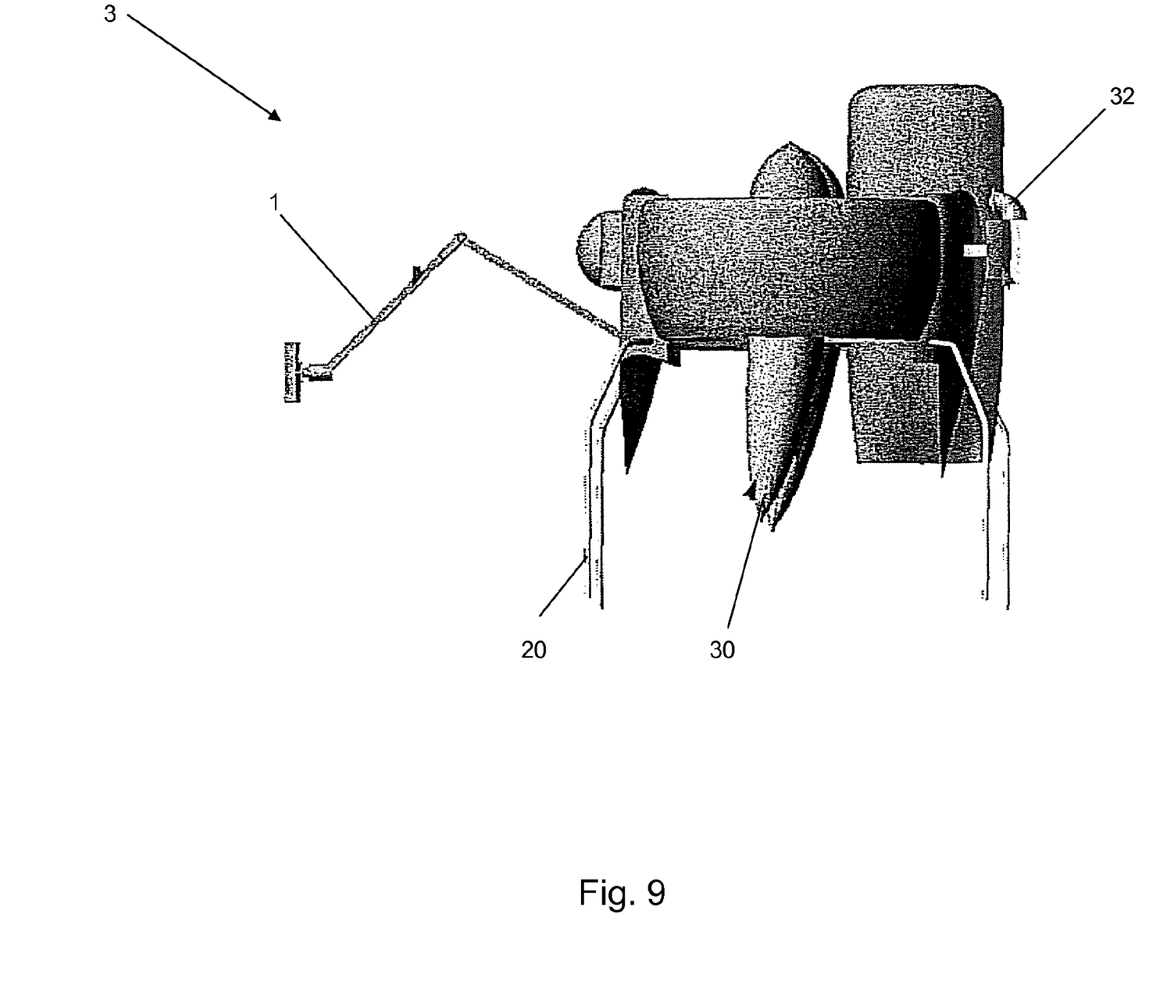
FIG. 9 is a pictorial side view of a ducted fan UAV having control vanes and counterbalances, according to an example.

Referring to FIG. 9, control vanes 30 are shown extending from the fans 2. The control vanes 30 may be moved so as to direct airflow in a certain direction, thereby changing the direction of the thrust force produced by the fans 2.

FIG. 9 also shows center of gravity ("CG") counterbalances 32. The counterbalances 32 may be extended in a direction so as to maintain the balance of the UAV 3 during flight or during the operation of the manipulator arm 1. When the manipulator arm 1 is in operation, the weight of the manipulator arm 1 may disrupt the balance of the UAV 3. Additionally, the operation the manipulator arm 1 is performing may cause additional forces to be exerted on the UAV 3.

For example, a UAV 3 in hover mode experiencing a displacement caused by a reciprocal torque from an operation being performed by the manipulator arm 1 may rotate, causing the direction of the airflow of the fans 2 to change direction. This may cause the direction of the fans to have a horizontal component, encouraging movement of the UAV 3 in a horizontal direction. Additionally, the amount of airflow dedicated to maintaining the altitude of the UAV 3 may be reduced, causing the UAV 3 to lose altitude.

A stability augmentation control system may be located on-board the UAV 3. The stability augmentation control system may be integrated into the avionics on-board the UAV 3. The stability augmentation system may sense an attitude change or a translational movement of the UAV 3, and may initiate a thrust to counter a torque on the UAV 3, and may change the position of the control vanes 30 to compensate for a translational movement. The stability augmentation control system may also receive inputs from a torque sensor located on the positioning grasp, discussed further with respect to FIG. 11.

The counterbalances 32 may help maintain the stability of the UAV 32 during the operation of the manipulator arm 1 if the center of gravity of the UAV 3 shifts because of movement of the manipulator arm, tools, or payloads. The counterbalances 32 may be extended outward from the UAV 3.

Figure 10:
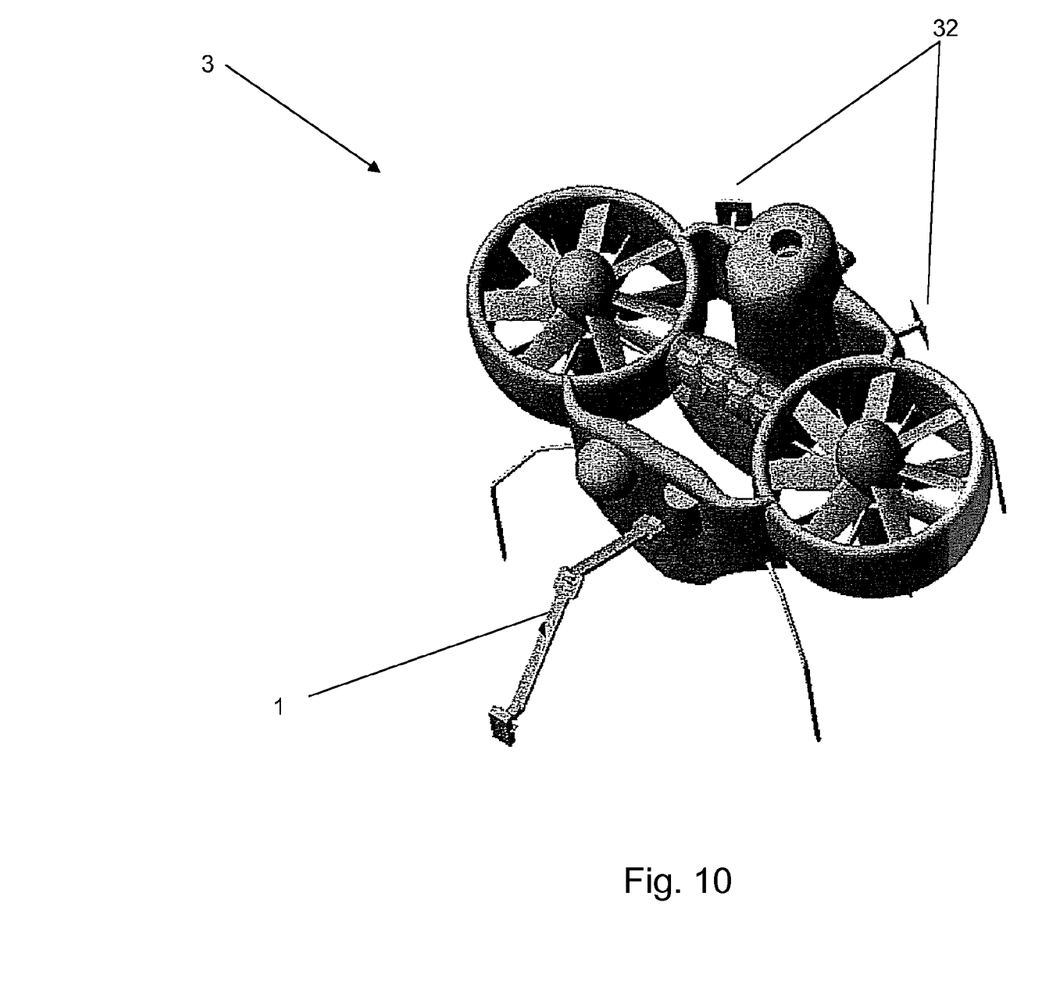
FIG. 10 is a pictorial top view of a ducted fan UAV having control vanes and counterbalances, according to an example.

Referring to FIG. 10, another view of the UAV 3 having counterbalances 32 deployed is shown. In FIG. 10, the UAV 3 is shown having two counterbalances 32. However, any number of counterbalances may be attached to the UAV 3. The counterbalances 32 may be deployed in any direction from the UAV 3 to maintain balance of the UAV 3. The counterbalances 32 may be deployed based on a user command, or may be deployed as a programmed response to the avionics system.

Figure 11:
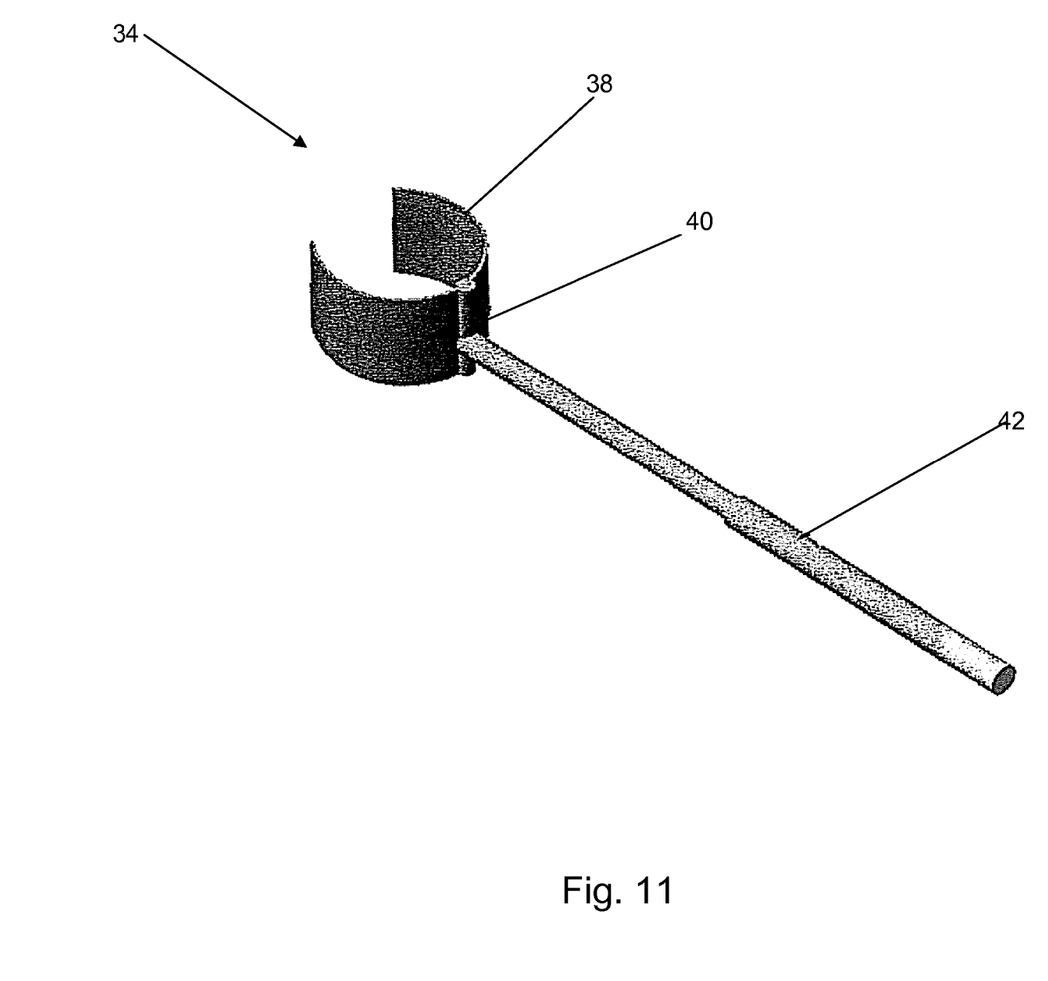
FIG. 11 is a pictorial view of a positioning arm, according to an example.

Referring to FIG. 11, a positioning grasp 39 is shown. The positioning grasp 39 may be affixed to the UAV 3. The positioning grasp 39 may have an arm 42, a clasp position control 40, and a positioning clasp 38. The positioning clasp 38 may be moveably attached to the arm 42. The arm 42 may have multiple portions, as described with respect to the manipulator arm 1. The arm 42 may also have a screw jack-type extender. In this way, the arm 42 may extend and retract depending on the desired positioning of the positioning grasp 39. The clasp position control 40 may operate to close and open the positioning clasp 38 to grasp an object.

A torque sensor may be located on the positioning grasp 39, and may provide data to the avionics or to the stability augmentation control system. The torque sensor may be located anywhere on the arm 42. The avionics or stability augmentation control system may implement torque-compensating measures to compensate at least in part for the torque sensed by the torque sensor.

Figure 12:
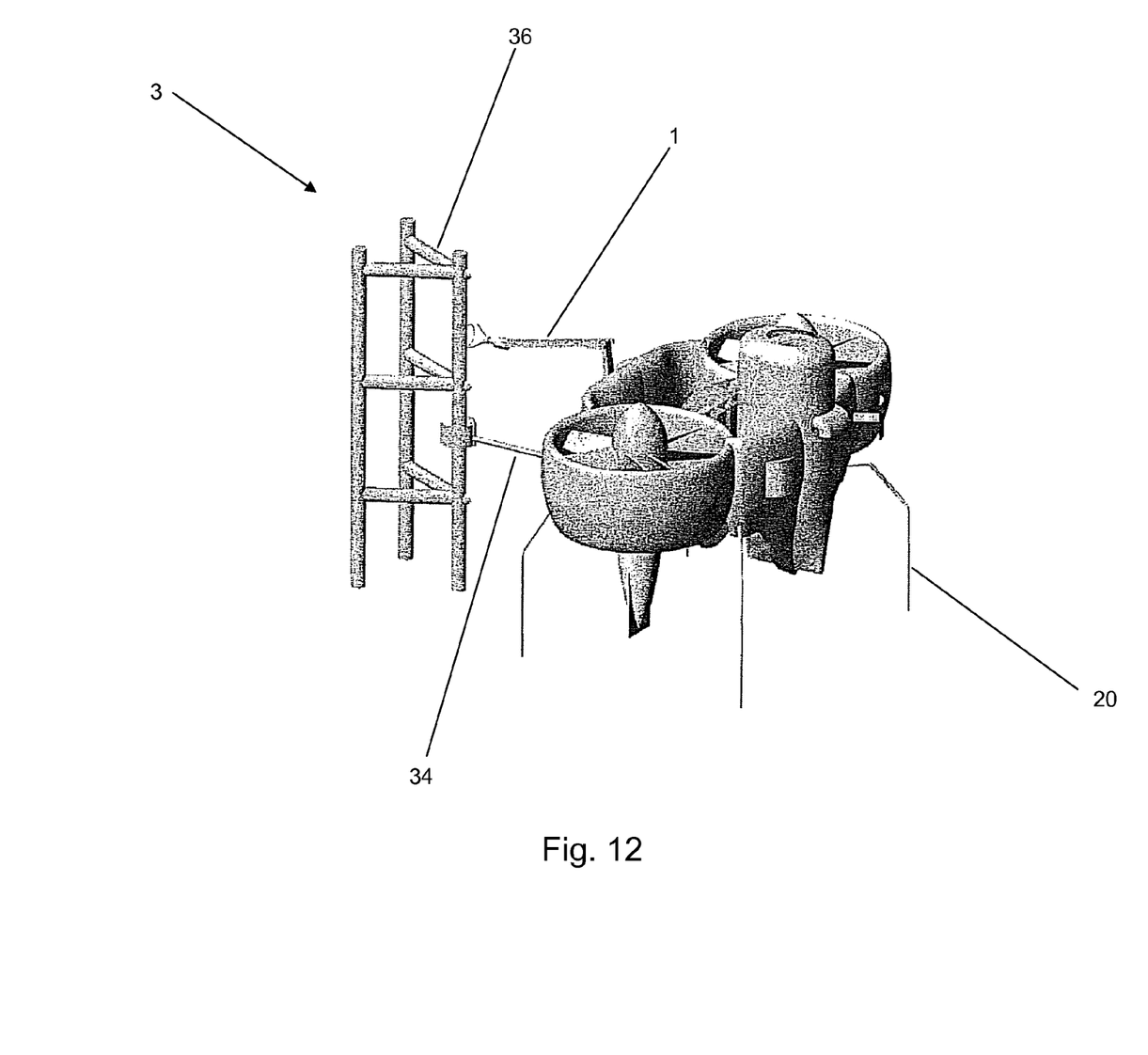
FIG. 12 is a pictorial view of a ducted fan UAV having a manipulator arm and a positioning arm, according to an example.

Referring to FIG. 12, a UAV 3 having a positioning grasp 39 is shown. The positioning grasp 34 is shown deployed and grasping a spire of a radio tower 36. By grasping a portion of the radio tower 36, the positioning grasp 39 may provide stability to the UAV 3, and may be effective in counteracting the torque and forces exerted on the UAV 3 from operation of the manipulator arm 1. Additionally, the positioning grasp 39 may assist in the operation of the manipulator arm 1 by stabilizing the position of the UAV 3, therefore making it easier for the manipulator arm 1 to contact the target site. Although a radio tower 36 is shown in FIG. 12, it should be understood that the positioning grasp 39 may grasp a variety of objects, and may preferably grasp an object immovably attached to the target site.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

I claim:

1. An unmanned aerial vehicle (UAV) comprising:
   at least one ducted fan;
   avionics;
   a manipulator arm comprising a plurality of moveable portions moveably attached to the UAV, wherein the manipulator arm is configured to extend away from the at least one ducted fan;
   manipulator arm controls configured to control movement of the manipulator arm;
   a positioning grasp, wherein the positioning grasp comprises a positioning grasp arm and a positioning clasp attached to the positioning grasp arm, wherein the positioning clasp is movable in relation to the UAV, and wherein the positioning clasp is configured to exert a clamping force on an object within reach of the positioning clasp; and
   a stability control system comprising at least one torque sensor located on at least one of the manipulator arm or the positioning grasp, wherein, in response to a torque sensed by the at least one torque sensor, the stability control system is configured to send an instruction to the avionics to compensate for the torque.

2. The UAV of claim 1, further comprising:
   at least one counterbalance movably attached to the UAV, wherein the counterbalance is configured to extend away from the at least one ducted fan to maintain a balance of the UAV during at least one of flight or during operation of the manipulator arm.

3. The UAV of claim 1, further comprising a payload stores pod positioned to be accessible by the manipulator arm.

4. The UAV of claim 1, wherein the manipulator arm further comprises a chuck tool attached to at least one moveable portion of the plurality of moveable portions.

5. The UAV of claim 1, further comprising:
   a toolkit, wherein the toolkit comprises a plurality of tools, and wherein the manipulator arm is configured to select and use at least one tool of the plurality of tools.

6. The UAV of claim 1, further comprising a signal receiver and processor,
   wherein the signal receiver and processor are configured to receive at least one signal from an operator;
   wherein the signal receiver and processor are configured to process the at least one signal from the operator; and
   wherein the signal receiver and processor are configured to transmit at least one command corresponding to the at least one signal from the operator to the manipulator arm controls.

7. The UAV of claim 1, further comprising:
   a sensor located on the manipulator arm, wherein the sensor is configured to sense information about surroundings of the UAV.

8. The UAV of claim 7, further comprising a controller, wherein the controller is configured to receive at least one input from the sensor; and wherein the controller is configured to send at least one output in response to the at least one input from the sensor to at least one of the avionics or the manipulator arm controls.

9. A method comprising:

with a stability control system, receiving, from at least one torque sensor located on at least one of a manipulator arm and a positioning grasp of an unmanned aerial vehicle (UAV), a signal indicating a torque sensed by the at least one torque sensor, wherein the UAV comprises:

at least one ducted fan, avionics, the manipulator arm comprising a plurality of portions moveably attached to the UAV, wherein the manipulator arm is configured to extend away from the at least one ducted fan, manipulator arm controls configured to control the movement of the manipulator arm, the positioning grasp, wherein the positioning grasp comprises an arm and a positioning clasp, wherein the positioning clasp is movable in relation to the UAV, and wherein the positioning clasp is configured to exert a clamping force on an object within reach of the positioning clasp, and the stability control system; and sending, with the stability control system, an instruction to the avionics to compensate for the torque.

10. The method of claim 9, further comprising moving at least one counterbalance a distance away from the UAV.

11. The method of claim 9, further comprising:

moving the manipulator arm to access a payload stores pod connected to the UAV, wherein the payload stores pod contains payload.

12. The method of claim 9, further comprising:

moving the manipulator arm to access a toolkit, wherein the toolkit comprises a plurality of tools;

connecting at least one tool to the manipulator arm; and using the tool to perform an operation.

13. The method of claim 9, further comprising:

receiving a signal from an operator; and moving at least one of the UAV and the manipulator arm in response to the signal from the operator.

14. The method of claim 9, further comprising:

receiving information from a sensor located on a UAV.

15. The method of claim 9, further comprising:

receiving, with a controller, at least one input from a sensor located on the UAV; and sending, with the controller, at least one output based on at least one input from a sensor to one of the avionics and the manipulator arm controls.

* * * * *